No. 637,293. Patented Nov. 21, 1899.
E. SEXTON.
AUTOMATIC GRAIN MEASURING ATTACHMENT.
(Application filed Nov. 23, 1898.)

(No Model.) 3 Sheets—Sheet 1.

WITNESSES:
INVENTOR
Earl Sexton
per Joshua Matlack, Jr.
Attorney

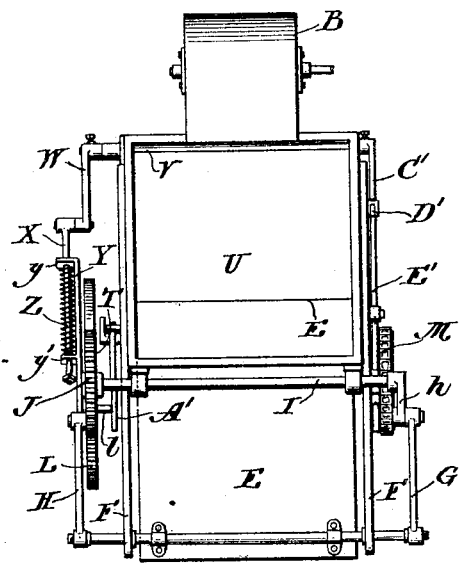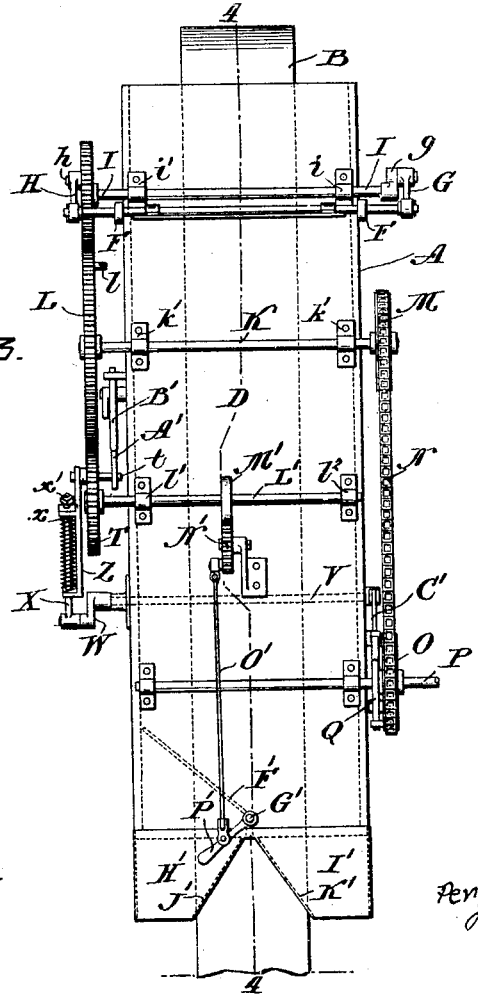

No. 637,293. Patented Nov. 21, 1899.
E. SEXTON.
AUTOMATIC GRAIN MEASURING ATTACHMENT.
(Application filed Nov. 23, 1898.)
(No Model.) 3 Sheets—Sheet 3.

WITNESSES INVENTOR

UNITED STATES PATENT OFFICE.

EARL SEXTON, OF PEMBERTON, NEW JERSEY.

AUTOMATIC GRAIN-MEASURING ATTACHMENT.

SPECIFICATION forming part of Letters Patent No. 637,293, dated November 21, 1899.

Application filed November 23, 1898. Serial No. 697,299. (No model.)

*To all whom it may concern:*

Be it known that I, EARL SEXTON, a citizen of the United States, residing at Pemberton, in the county of Burlington and State of New Jersey, have invented a new and useful Automatic Grain-Measuring Attachment for Threshing-Machines, of which the following is a specification.

My invention relates to harvesting machinery, particularly to threshers, whose object is to measure the grain as it comes from said thresher and permit of its easy and expeditious handling; and it consists of an automatic measuring device or attachment which is located adjacent the conveyer or elevator of a thresher and is provided with an upper cut-off and a lower dump, either sliding or pivoted, so arranged and operated by suitable machinery that they automatically open and close alternately and successively, one being closed prior to the opening of the other, to fill and empty the measuring-box, cutting off the supply of grain as the contents of the box are dumped and refilling said box on the return of the lower dump to its place and the withdrawal of the upper cut-off, the novel details of construction of said measuring attachment being fully set forth in the following description, particularly pointed out in the claims, and shown in the accompanying drawings, which form a part of this specification, in which drawings—

Figure 1:
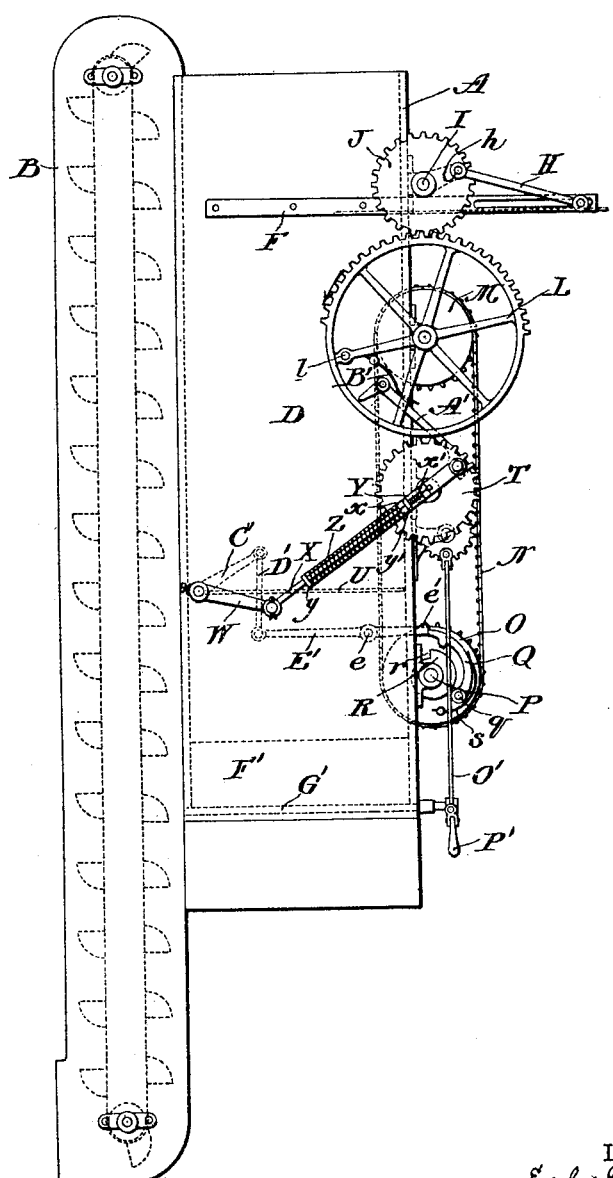

Figure 1 represents a side elevation embodying my invention, showing the arrangement of machinery at the left of the device, looking at the front thereof, and the conveyer in its rear. Fig. 2 represents a plan view of the same. Fig. 3 represents a front elevation; and Fig. 4 represents a section on the line 4 4 of Fig. 3, showing the machinery on the right of the device, looking at the front of the same, the conveyer in its rear, and particularly disclosing the internal arrangement and relative positions of the upper slide and the lower tilting board in full lines during the filling of the measuring-chamber and in dotted lines during the emptying of the same.

Similar letters of reference designate corresponding parts throughout the several views.

Figure 4:
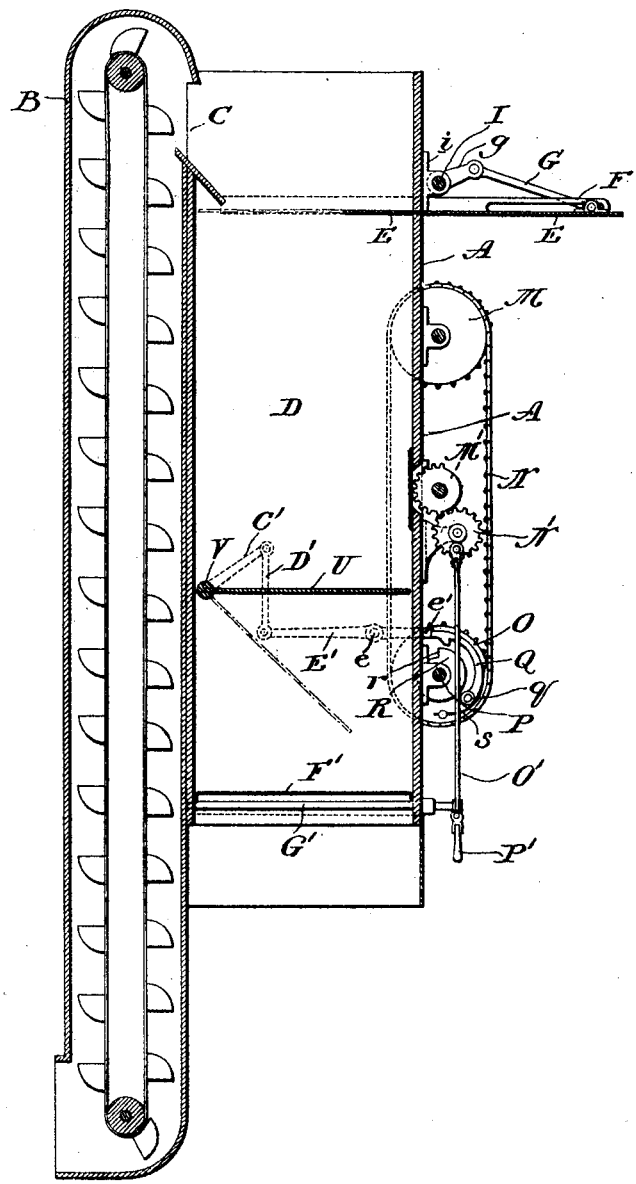

Reference being had to the drawings and to a description of the mechanism in detail, A designates my improved measuring attachment or device, which is located adjacent the grain conveyer or elevator B of a thresher, (the latter not being shown,) with which conveyer the device has communication by the opening or passage-way C, Fig. 4, through which the grain is passed and dumped into the measuring-chamber D of the attachment.

E designates the upper cut-off slide, which is mounted in the upper portion, or substantially so, of the device and preferably arranged so that it will slide in and out in the guides F. To the outer edge of said slide is movably attached one or more connecting-rods G and H, the other end of rod G being pivoted to a crank-arm $g$, which in turn is attached to the shaft I, which is journaled a suitable distance above the slide E in bearings $i$ and $i'$. The opposite end of rod H is likewise pivoted to a crank-arm $h$, which in turn is attached to shaft I, upon which shaft at this end thereof is mounted a cog-wheel J, the motion of which operates the slide E through the medium of said connecting-rods and crank-arms.

Below the slide E upon the face of the device in bearings $k$ and $k'$ is journaled shaft K, having mounted on its left end the semitoothed wheel L and on its right end the sprocket-wheel M, the teeth of wheel L being adapted to mesh with those of the wheel J above it to operate the latter and the wheel M being in engagement, by means of endless chain N, with the sprocket-wheel O, loosely mounted on the power-shaft P, the said wheel O having affixed thereto, as at $q$, a pawl Q, and upon the inner end of shaft P, adjacent the wheel O, is permanently mounted the concentric cam R, arranged to be engaged by and disengaged from the pawl Q, as at $r$, and a spring S is so arranged with respect to the sprocket-wheel O and pawl Q that the latter will be normally held in engagement with the former as shown. One end of said spring is attached to the wheel, while the other operates upon or is attached to the pawl.

It will of course be understood that I do not confine myself to the sprocket-wheels and chain as a means of transmitting motion; but any suitable instrumentalities must be considered as within my invention.

A suitable distance below the semitoothed wheel L and adapted to mesh therewith and be operated thereby is mounted a cog-wheel T of similar dimensions to cog-wheel J, and it is noted that the wheel L is so arranged with respect to these two cog-wheels that its teeth will alternately and successively engage the teeth of the respective cog-wheels in its revolutions, thereby imparting alternate and successive motion to the slide E and the tilting board U, located on the inside of the measuring-chamber D or forming its bottom, said board being carried by a shaft V. To the left end of this shaft V on the outside of the device is attached a crank-arm W, to the free end of which arm is attached one end of a compound connecting-rod, one portion sliding upon the other, the sliding member X moving in the guides $y$ and $y'$ on the other member Y, the free end of the bar X being screw-threaded and provided with screw-nuts $x$ and $x'$, adapted to regulate the tension of the tension-spring Z, which encircles the bar X and having its respective ends abutting against the guides $y$ and $y'$, and the other end of the rod Y is pivoted to the cog-wheel T. Through the medium of this mechanism the tilting board is partly and finally operated.

Located adjacent the semitoothed wheel L and the cog-wheel T is trip-lever A', adapted to be operated upon by the former, while it in turn operates upon the latter. Preferably, and as shown, this lever is pivoted to the side of the device intermediate of the said two wheels and at the angle shown in Fig. 1. It is provided at its lower end with a notch adapted to be engaged by a pin on wheel T, as shown at $t$, which holds the said wheel against motion, while its other end is adapted to be tripped by a pin $l$ on wheel L, which raises the opposite end of said lever, throwing it out of engagement with wheel T, releasing the same and permitting it to be revolved by said wheel L, and in connection with said lever is a spring B', arranged and adapted to hold it in engagement with said wheel T.

To the right-hand end of shaft V is attached a crank-arm C', to the free end of which is pivoted vertical connecting-rod D', the other end of said rod being pivoted to a trip-lever E', pivoted at $e$ to the side of the box, the free end of said trip-lever being adapted to operate upon the pawl Q, as at $e'$, to counteract the spring S and throw said pawl out of engagement with the concentric cam R.

The operation of the device is as follows: The machine in its normal position is as shown in Fig. 1 and full lines, Fig. 4, the measuring-chamber D being fed with grain through the opening C by means of the conveyer B, at which time the slide E is out and the tilting board up and the operative machinery at rest or out of operation, the trip-lever C' holding pawl Q away from and out of engagement with cam R, permitting the shaft P to revolve freely, the teeth of the semitoothed wheel L being in engagement with the upper cog-wheel J midway of its own teeth, as shown in Fig. 1, and the trip-lever A' holding the lower cog-wheel T against motion, thus preventing undue disturbance of the tilting board upon which the grain is being dumped. When the requisite quantity of grain is in the chamber D, the weight of said grain being equivalent to its desired measure, the spring Z, having been set to be affected at this particular moment, is depressed by the action of the tilting board from the weight thereon, the free side of said board dropping just enough to permit the trip-lever E' to move out of contact with the pawl Q, which by the action of its spring S is thrown in engagement with cam R, thereby causing the operative machinery to be placed in connection with the power-shaft P, which, now revolving the sprocket-wheel O, in turn sets in motion the sprocket-wheel M by means of chain N, which transmits motion to semitoothed wheel L, simultaneously sending in the slide E and cutting off the supply of grain. On the arrival of said slide to its inward limit the teeth of the wheel L immediately commence to engage the wheel T, the same having been freed just previously by the tripping of lever A' through pin $l$ on wheel L, the continued revolution of which latter revolves the wheel T, which, through the medium of its connections with the tilting board U, throws the free side of said board entirely down, thereby dumping the grain into the bags or other receptacles placed under the device to receive it. At this time one-half of the teeth of wheel L have passed over cog-wheel T, which continuing thus to revolve the other half of said teeth on wheel L raises the tilting board again to its place, the trip-lever A' engages and holds the wheel T as before, the wheel L revolves wheel J, throwing the slide out, and the trip-lever E' again contacts with pawl, releasing it from cam R, stopping the machinery, and the device is again ready for filling.

It is obvious that the mechanism is put in motion primarily by the weight of the grain in the chamber D of the device, said grain bearing on the tilting board U, causing it to drop slightly at its free edge and depress the spring Z. This movement in turn causes the trip-lever E' to cease its operation upon the pawl Q, the spring of which causes said pawl to engage the cam R, and the mechanism is in engagement with the power-shaft and the machine is in full operation, the movement of the semitoothed wheel L throwing in the sliding cut-off and then dumping the tilting board to its full extent.

It will be observed that the initial and final movements of the tilting board are entirely independent of the receiver, the latter, as shown, having no motion whatever; but it is to be understood that my invention is not to be limited to a stationary receiver, said invention covering any construction wherein the tilting board upon its movement, caused by the weight of the contents of the receiver on said board, throws the mechanism of the device into operation, said tilting board moving irrespective and independent of the receiver.

The machine may be so constructed that one or more bags can be filled alternately and successively. In the present instance and as preferred it is made to serve two sacks by means of the divider F', secured on shaft G', the same being arranged within the casing at right angles to its front, the divider alternately opening and closing the two flues H' and I' by its movement, which flues are formed by the partition-walls J' and K', as in Fig. 3. This divider can be manipulated, as is evident, either by hand or by the operation of the machine itself. The drawings disclose one method of the latter, which consists in journaling in bearings $l'$ and $l^2$ to the front of the box or casing a shaft L', to which is secured the above-referred-to cog-wheel T. At a suitable point on this shaft is mounted a semi cog-wheel M', and below and so as to mesh therewith is journaled a cog-wheel N', to which latter is pivoted connecting-rod O', the other end of said rod being attached to crank-arm P', secured to the shaft G', carrying the divider F'.

The operation of the divider is as follows: The board U is in its raised or normal position, the chamber D is being filled, and the semi cog-wheel M' has just ceased to mesh the cog-wheel N', as shown in Fig. 4. During the disengagement of M' with N' the divider is at rest and the board U dumps the grain, the said divider directing it to the desired flue and thence to the bag. Upon M' again engaging N' the board U is being raised while the divider is thrown to register with the opposite flue, and so on alternately and intermittently. It will thus be noted that the divider is thrown during the raising of the board U to its place, and said divider remains at rest when said board dumps the grain. The object of this divider is to at all times have one bag under the machine and being filled and to permit the removal of the filled one and its replacement by an empty bag before the one remaining bag is filled; but it must be understood that said divider, with its attached mechanism, may be dispensed with without in the least departing from the spirit of my invention.

Having thus described my invention, what I claim as new, and desire to secure by Letters Patent, is—

1. In an automatic grain-measuring device, a cut-off and a tilting board arranged to operate alternately with respect to each other, the cut-off being out when the tilting board is up, and vice versa, the same being primarily set in motion by the weight of the contents of the device upon the tilting board, which causes the latter to move independent of the receiver.

2. In an automatic grain-measuring device, a sliding cut-off and a tilting board arranged to operate alternately with respect to each other, the same being thrown into operation by the weight of the contents of said box upon the tilting board whereby the same is caused to drop slightly independent of the receiver and depress a spring which in turn throws the mechanism into engagement with the power-shaft whereby the movements of the cut-off and tilting board are completed.

3. An automatic measuring device for threshers consisting of a box or casing adapted to receive the grain, a power-shaft, a horizontally-sliding cut-off, a tilting board, mechanism for alternately, successively and reversely operating said cut-off and board from said power-shaft, and means for engaging and disengaging the said shaft with and from said mechanism, the mechanism being primarily put in operation by the weight of the contents of said box upon the tilting board, which latter has its movement irrespective and independent of the receiver.

4. An automatic grain-measuring device for threshing-machines consisting of a box or casing adapted to receive the grain, a device in said box adapted to hold the contents thereof within the same and allow them to escape therefrom, a power-shaft adjacent said box adapted to revolve free from the mechanism of said box, mechanism for operating the device within the casing from the power-shaft, a spring in connection with said inner device adapted to be affected by the weight of said contents on said inner device which latter has its movement irrespective of the receiver, and mechanism so arranged that the movement of said inner device will cause the engagement and disengagement of the power-shaft from the mechanism of the measuring device.

5. An automatic grain-measuring device for threshing-machines consisting of a box or casing adapted to receive grain, a horizontally-sliding cut-off and a tilting board within said box, a power-shaft adjacent the box adapted to revolve free from the mechanism of said box, mechanism for operating from the power-shaft the said cut-off and tilting board alternately, successively and reversely, a spring in connection with the tilting board adapted to be affected by the weight of the contents of the casing upon said board, and mechanism so arranged that the movement of said tilting board will cause the engagement and disengagement of the power-shaft from the mechanism of the measuring device.

6. An automatic measuring device for a threshing-machine consisting of a box or casing adapted to receive grain, a power-shaft adapted to revolve free from the mechanism of said casing, a sprocket-wheel loosely mounted on said shaft, a cam located adjacent said wheel permanently affixed to the shaft, a pawl mounted on said wheel adapted to engage said cam, a spring adapted to normally hold the pawl in engagement with the cam; a horizontally-sliding cut-off in said box, a cog-wheel mounted on the latter, means whereby the said slide is operated by said cog-wheel; a tilting board within the casing, a second cog-wheel mounted on the latter, means whereby the board is partly and finally operated by said cog-wheel; a tension-spring mounted on said means so arranged that the weight of the contents of the box on the board will affect said spring, means for holding said second cog-wheel against movement, a trip-lever operated by the movement of the tilting board, said lever being adapted, on such movement, to operate upon the pawl located on the power-sprocket to throw said pawl out of engagement with the cam on the power-shaft; a second shaft on said casing, a sprocket-wheel mounted on said shaft, a chain connecting the two sprocket-wheels, a semi-toothed wheel mounted on said second shaft intermediate of and adapted to mesh with and operate alternately, successively and reversely the upper and lower cog-wheels, and means on said semitoothed wheel for tripping the lever holding the lower cog-wheel.

7. An automatic grain-measuring device for threshing-machines consisting of a box or casing adapted to receive grain, a horizontally-sliding cut-off and a tilting board within said casing, a power-shaft adjacent the same adapted to revolve free from the mechanism thereof, mechanism for operating from the power-shaft the said cut-off and tilting board alternately, successively and reversely, a spring in connection with the tilting board adapted to be affected by the weight of the contents of the casing upon said board, mechanism so arranged that the movement of said tilting board will cause the engagement and disengagement of the power-shaft from the mechanism of the measuring device, and a divider mounted within the casing so operated as to open and close alternately and intermittently the flues of said casing.

EARL SEXTON.

Witnesses:
BLANCHARD H. WHITE,
JOSEPH EARL.